April 18, 1961  C. J. EDWARDS, JR., ET AL  2,980,144
FLEXIBLE HOSE CONSTRUCTION
Filed Jan. 2, 1959

INVENTOR.
CYRIL J. EDWARDS JR.
ROLLIN E. WINEGAR
BY
Oberlin, Maky, & Donnelly
ATTORNEYS United States Patent Office 2,980,144
Patented Apr. 18, 1961

2,980,144

FLEXIBLE HOSE CONSTRUCTION

Cyril J. Edwards, Jr., Grosse Pointe Farms, Mich., and Rollin E. Winegar, Willoughby, Ohio, assignors to The Eagle-Picher Company, Cincinnati, Ohio, a corporation of Ohio Filed Jan. 2, 1959, Ser. No. 784,727

9 Claims (Cl. 138—109)

This invention relates to a flexible hose construction, and more particularly to an insulated air conducting hose developed primarily for use as a so-called defroster hose in automobiles.

Various types of flexible tubing have been made in the past and employed for many purposes, large quantities being employed as defroster hose in automobiles and for similar purposes. This tubing is commonly known as corrugated tubing and is formed usually of a helically wound reinforcing wire and rubber impregnated fabric, being produced in continuous lengths and then cut to the desired short sections for mounting in the automobile. It has not been found entirely satisfactory for several reasons. First of all, an excessive amount of sound is transmitted from the engine compartment to the passenger compartment. Also, the blower motor itself and air passing through the hose may create an excessive amount of sound. Furthermore, when tubing of this type is cut into sections, the end of the helical wire reinforcing member is thereby generally exposed, presenting sharp edges which often injure the hands of the workers assembling the automobile defroster components and which may also snag and tear the fabric of adjacent hose sections. As with everything else in automotive construction, it is of the greatest importance that the parts be capable of rapid assembly and when thus assembled remain properly secured.

When employed as a defroster hose or for other similar purposes, the severed end of the corrugated tubing is commonly forced over the end of a metal tube or nipple and retained in place by friction alone. This, however has not been entirely satisfactory since the fabric or outer covering may start to tear back from the end and the tubing may require to be secured to the metal tube or nipple by means of friction tape or the like. This necessarily results in adidtional time and expense in the assembly of the automobile.

It is therefore the primary object of our invention to provide a flexible hose member which can be quickly and easily installed in an automobile.

Another object of our invention is to provide a construction for the hose which will secure and guard the otherwise exposed end portions of reinforcing and supporting wires while at the same time greatly improving the appearance of the article.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative however, of but a few of the various ways in which the principle of the invention may be employed.

Figure 1:
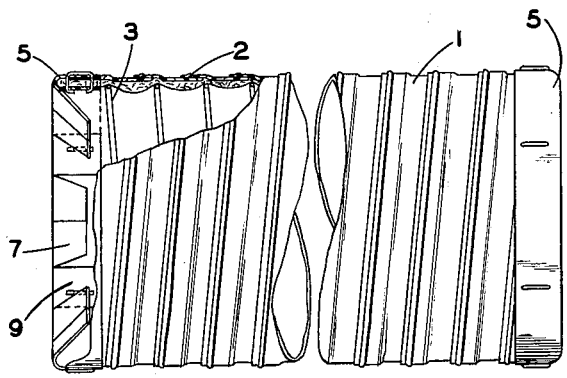
Fig. 1 is a side elevation of our new flexible hose construction, partly in section.

Referring now to the drawing and more particularly to Fig. 1, there is shown an embodiment of our invention comprising a flexible hose construction having an outer spirally wrapped flexible covering 1. This covering 1 may be made of a suitable plastic material such as black, low pressure polyethylene and may have a reinforcing wire 2 embedded therein between the overlapping layers thereof. However, this reinforcing wire may be omitted if desired. The adjacent convolutions of this covering 1 are cemented or heat sealed together where they overlap to form a continuous wall. Such wall is supported by supporting wire element 3, and between such internal helix 3 and the outer covering 1 there is placed a layer 4 of thick padding or other suitable, sound absorbing material, the helix 3 being of a diameter to retain the layer 4 tightly against the outer covering 1. The padding layer 4 may be of any suitable material such as for example, fiberglass, felt, batting or sponge rubber. This padding is placed circumferentially along the entire inside wall of the hose. Thus, it will be seen that the padding will be held in place by the outward force of the supporting wire 3 and kept from collapsing and cutting off the air flow when the hose is flexed.

The convolutions of the wire helix 3 may be random in number and this number may be greater or lesser in number than the convolutions of the reinforcing wire 2. Also, a reverse hand may be employed for the wire helix 3. For the best flexibility characteristics, it is, however, better to have the same hand and number of turns in each wire 2 and 3 and juxtapose or closely interspace the convolutions of each as shown in Fig. 1.

Figure 2:
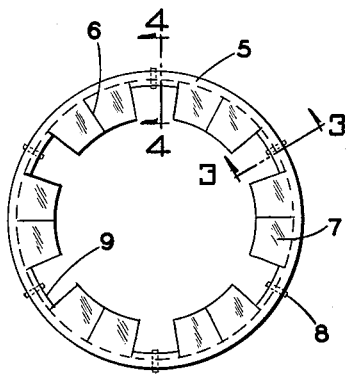
Fig. 2 is an end elevation of our flexible hose construction.
Figure 3:
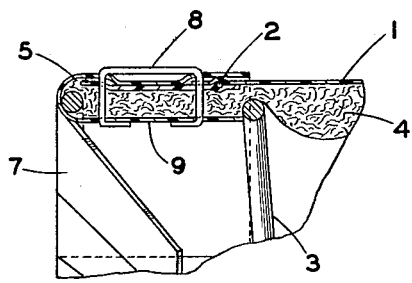
Fig. 3 is a fragmentary enlarged sectional view taken on line 3—3 of Fig. 2 illustrating the cap secured to the end of the flexible hose.
Figure 4:
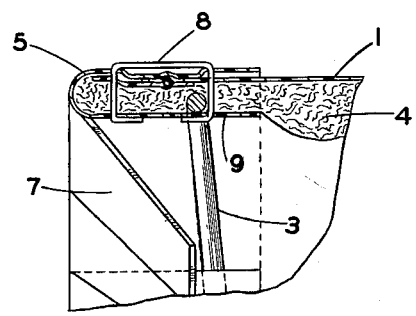
Fig. 4 is a view similar to Fig. 3 taken on line 4—4 of Fig. 2 showing how the cap fastening means grips the end convolution of the helical support wire.

As shown in Figs. 2, 3 and 4, an end cap 5 is placed over each end of the hose. The cap 5 is formed of suitable plastic material and is considerably more rigid than the plastic material used for the flexible outer covering 1 and has an outer generally cylindrical portion which fits over the end of the hose. The inner portion of the cap is slit or slotted as most clearly shown at 6 in Fig. 2 and this portion of the cap is folded over the end of the hose with the slots forming a series of reentrant diagonally slanting tabs 7 spaced about the inner periphery of the hose end opening. In order to retain end cap 5 in place, several staples 8, or equivalent fasteners, are passed through the outer generally cylindrical portion of the cap at circumferentially spaced points and through certain corresponding inwardly directed tabs 9 that are substantially parallel to the outer portion of the cap as most clearly shown in Figs. 2–4.

As illustrated in Fig. 4, some of the staples 8 are positioned to enclose and grip the end convolution of supporting wire 3 and the end convolution of reinforcing wire 2. Thus, it will be seen that the end cap 5 is securely fastened to the supporting wire helix 3 through the staple 8 as well as reinforcing wire 2 so that a mere rupture of the outer covering 1 would not result in disintegration of the hose. End cap 5 not only protects the end of the tubing and guards the end of the severed support wire 3, but also helps to retain the sound absorbing material 4. Moreover, with the cap, no circular loop need be provided in the end portion of support wire 3.

As will readily be appreciated, the reentrant or inwardly directed tabs 7 make the hose more easily secured on the duct or nipple to which it is fitted. The duct or nipple may have a small outwardly directed flange or shoulder and the tabs will then catch behind the flange, thus holding the hose securely thereon. However, mere frictional engagement between the tabs and the outer surface of the duct is usually sufficient.

It will be seen that we have provided a hose construction that will effectively eliminate any undesirable sound. This hose construction can be cheaply and easily manufactured and furthermore, is adapted for quick and secure installation in an automobile.

The helical wire reinforcing the outer covering 1, if employed, may be of steel but it is preferable to use a dry drawn copperized bead wire. The supporting wire 3 is preferably steel wire, but it will be appreciated that other suitable materials may be employed including wires of certain synthetic plastics.

Other modes of applying the principle of the invention may be employed, change being made as regards the details described, provided the features stated in any of the following claims or the equivalent of such be employed.

We therefore particularly point out and distinctly claim as our invention:

1. In flexible tubing having a helical elongated supporting element and a flexible wall supported thereby, an annular end cap of general U-shape cross-section fitted over the cylindrical end of the tubing, and attaching means for said cap passing therethrough and gripping said supporting element.

2. The flexible tubing set forth in claim 1 wherein said cap has an inner slotted portion forming a plurality of tabs, certain tabs being secured to the tubing and the remainder projecting diagonally inwardly.

3. The flexible tubing set forth in claim 1 wherein said attaching means is a staple which grips an end convolution of said supporting element.

4. In flexible tubing having a spirally wrapped outer flexible covering with a helical reinforcing wire embedded therein, an inwardly spaced layer of sound absorbing material held against the outer flexible covering by an inner supporting wire helix, an annular end cap of general U-shape cross-section fitted over the cylindrical end of the tubing, said cap having an inner portion formed of a plurality of reentrant tabs, and staple attaching means for said cap passing therethrough and gripping said supporting wire helix.

5. The flexible tubing set forth in claim 4 wherein said staple attaching means grips both the reinforcing wire and the supporting wire.

6. The flexible tubing set forth in claim 4 wherein the staple attaching means passes through certain of said reentrant tabs and secures the same to the tubing.

7. The flexible tubing set forth in claim 4 wherein the convolutions of the supporting wire are closely interspaced with the convolutions of the reinforcing wire.

8. In flexible tubing having a helical elongated supporting element and a flexible wall supported thereby, an annular end cap fitted over the cylindrical end of the tubing, and attaching means for said cap passing therethrough and gripping said supporting element.

9. In flexible wall tubing, an annular end cap of general U-shape cross-section fitted over the cylindrical end of the tubing, the inner side of said cap being slotted forming a plurality of tabs, attaching means for said cap passing therethrough and gripping certain of said tabs thus securing the end cap to the tubing, the remainder of said tabs projecting diagonally inwardly.

References Cited in the file of this patent

UNITED STATES PATENTS

| 2,683,466 | Guiles | July 13, 1954 |
| 2,707,492 | Harris et al. | May 3, 1955 |
| 2,861,598 | Carder et al. | Nov. 25, 1958 |

FOREIGN PATENTS

| 69,088 | Denmark | Apr. 19, 1949 |
| 565,833 | Great Britain | Nov. 30, 1944 |